(12) United States Patent
Troesch

(10) Patent No.: US 9,785,876 B2
(45) Date of Patent: Oct. 10, 2017

(54) DATA TRANSMISSION USING OPTICAL CODES

(71) Applicant: Inventio AG, Hergiswil NW (CH)

(72) Inventor: Florian Troesch, Erlenbach (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 15/025,907

(22) PCT Filed: Sep. 29, 2014

(86) PCT No.: PCT/EP2014/070725
§ 371 (c)(1),
(2) Date: Mar. 30, 2016

(87) PCT Pub. No.: WO2015/049186
PCT Pub. Date: Apr. 9, 2015

(65) Prior Publication Data
US 2016/0224877 A1    Aug. 4, 2016

(30) Foreign Application Priority Data
Oct. 1, 2013   (EP) .................................. 13186975

(51) Int. Cl.
*G06K 19/06*   (2006.01)

(52) U.S. Cl.
CPC . *G06K 19/06028* (2013.01); *G06K 19/06037* (2013.01); *G06K 19/06046* (2013.01); *G06K 19/06093* (2013.01)

(58) Field of Classification Search
USPC ........................................ 235/494, 375, 487
See application file for complete search history.

(56) References Cited

U.S. PATENT DOCUMENTS

| | | | |
|---|---|---|---|
| 2012/0211566 A1* | 8/2012 | Hensel | G06K 7/10732 235/462.42 |
| 2014/0097238 A1* | 4/2014 | Ghazizadeh | G01D 18/00 235/375 |
| 2014/0117074 A1* | 5/2014 | Kim | G06K 7/1095 235/375 |
| 2015/0235118 A1* | 8/2015 | Simske | G06K 19/0614 235/494 |

FOREIGN PATENT DOCUMENTS

| | | |
|---|---|---|
| EP | 1705595 A2 | 9/2006 |
| EP | 2458527 A2 | 5/2012 |
| TW | M353974 U1 | 4/2009 |
| TW | 201237784 A1 | 9/2012 |
| TW | 201327276 A | 7/2013 |
| WO | 2012015402 A1 | 2/2012 |

* cited by examiner

*Primary Examiner* — Allyson Trail
(74) *Attorney, Agent, or Firm* — William J. Clemens; Shumaker, Loop & Kendrick, LLP

(57) ABSTRACT

Data can be encoded in an optical code by a method and a system using combinations of visually distinguishable features. In some cases, the data is represented using a ratio of two or more features.

17 Claims, 14 Drawing Sheets

= RED

= GREEN

= BLUE

DATA TRANSMISSION USING OPTICAL CODES

FIELD

This disclosure relates to transmitting data using optical codes.

BACKGROUND

Optical codes are often used for transmitting data. For example, an optical code scanner can read data encoded in a bar code or in a Quick Response (QR) code. However, at least some types of optical codes require relatively long read-times. Some optical code technologies allow for a relatively narrow range of positions and angles at which a code and a reader must be placed relative to each other. It is sometimes also necessary for an optical code reader to first focus on the object bearing the optical code.

EP1705595A2 describes a system that transmits password information as a password motion picture signal. The password motion picture signal changes its uniform color of a frame at a predetermined frame interval according to the password information.

SUMMARY

Further options for optically transmitting data could be advantageous.

Data can be encoded in an optical code using combinations of visually distinguishable features. In some cases, the data is represented using a ratio of two or more features.

Some embodiments of a method comprise: receiving a data value for encoding in an image; and generating the image, the image comprising a plurality of encoding regions, each of the encoding regions containing a respective representation of the data value, the data value being discernible based on any one of the plurality of encoding regions, the encoding regions being arranged with a selected density within the image of at least two. The generating the image comprises selecting, based on the data value, an encoding image out of a set of encoding images. The selected encoding image can comprise a plurality of elements arranged in a grid, the elements being identical elements or being different elements. The plurality of elements can be colored shapes, such as squares, rectangles, circles, crosses, triangles, ovals, rhombuses, stars, and trigrams. The colored shapes can be at least one of red, blue, and green. The plurality of elements can be arranged in a repeating pattern in the grid. In some cases, the selected image comprises a first element in the representation of the data value, the generating the image further comprising: selecting, based on the data value, an additional image out the set of encoding images, the selected additional image comprising a second element in the representation of the data value; and combining the selected image and the selected additional image. The representation of the data value can be based on a ratio of a first element in one of the encoding regions and a second element in the one of the encoding regions. The ratio can be a ratio of a number of the first element to a number of the second element. The ratio can also be a ratio of a surface area occupied by the first element to a surface area occupied by the second element. In some cases, the image is one in a sequence of images for decoding, each image in the sequence of images encoding a portion of a piece of information. The sequence of images can be a time-varying sequence displayed on an electronic display.

Further embodiments of a method comprise: using an image sensor, obtaining an image of at least a portion of a picture shown on a surface, the picture comprising a plurality of encoding regions, each of the regions containing a respective representation of a common data value, the encoding regions being arranged with a selected density within the picture of at least two; identifying first and second elements in at least one of the regions; and based on the identified first and second elements, determining the common data value. In some cases, each of the respective representations of the common data value is based on a ratio between a first element in the representation and a second element in the representation, the determining the common data value comprising determining the ratio and determining an associated value for the ratio.

Exemplary embodiments of a system comprise: an image sensor; and a computer-based control unit coupled to the image sensor, the control unit being configured to obtain, using the image sensor, an image of at least a portion of a picture shown on a surface, the picture comprising a plurality of encoding regions, each of the regions containing a respective representation of a common data value, the encoding regions being arranged with a selected density within the image of at least two, identify first and second elements in at least one of the regions, and based on the identified first and second elements, determine the common data value. The image sensor can be configured to read the image without focusing on the surface.

Further embodiments of a method comprise: identifying an amount of a first color in an image, the image having been captured from a display of a portable electronic device; identifying an amount of a second color in the image; determining a ratio of the amount of the first color to the amount of the second color; and based on the determined ratio, determining a value encoded in the image. In some embodiments, the amounts of the first color and the second color are respective surface areas in the image.

Further embodiments comprise a computer-based device configured to perform one or more of the disclosed methods.

At least some embodiments of the disclosed methods can be implemented using a computer or computer-based device that performs one or more method acts, the computer or computer-based device having read instructions for performing the method acts from one or more computer-readable storage media. The computer-readable storage media can comprise, for example, one or more of optical disks, volatile memory components (such as DRAM or SRAM), or non-volatile memory components (such as hard drives, Flash RAM or ROM). The computer-readable storage media do not cover pure transitory signals. The methods disclosed herein are not performed solely in the human mind.

DESCRIPTION OF THE DRAWINGS

The disclosure refers to the following figures, in which.

DETAILED DESCRIPTION

Figure 1:
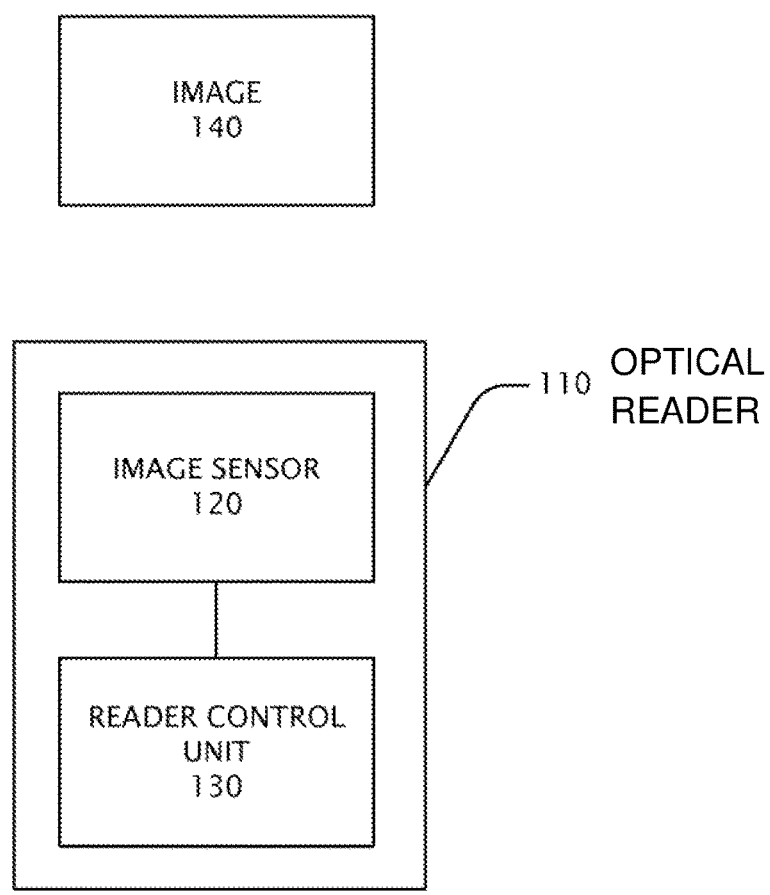
FIG. 1 shows a block diagram of an exemplary embodiment of an optical reader.

FIG. 1 shows a block diagram of an exemplary embodiment of an optical reader 110. The reader 110 comprises an image sensor 120 coupled to a reader control unit 130. The image sensor 120 comprises, for example, a CCD (charge-coupled device) sensor, a CMOS (complementary metal-oxide semiconductor) sensor, or another type of optical sensor. In some cases, the image sensor 120 can focus on an image; in other cases, the image sensor 120 is not equipped to focus on an image. The image sensor 120 can have a lens, or it can function without a lens. The reader control unit 130 is a computer-based device comprising a processor that is programmed to perform one or more of the method acts disclosed in this application. The processor can be coupled to a memory that stores corresponding instructions for the processor. The reader 110 records an image 140. The image 140 appears on a display of a portable electronic device (not shown), or on another surface (e.g., a piece of paper).

Figure 2:
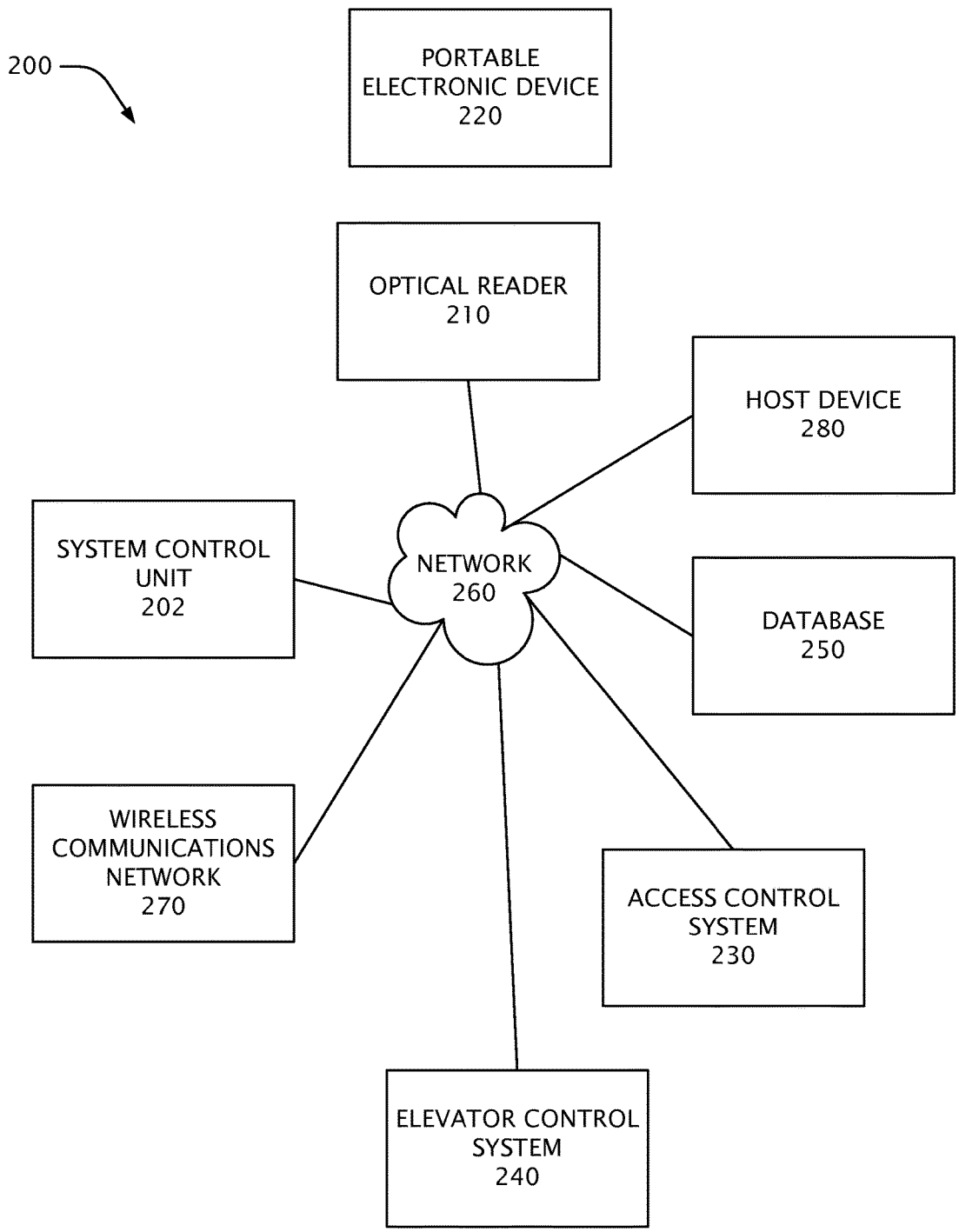
FIG. 2 shows a block diagram of an exemplary embodiment of a system for use with an optical reader.

FIG. 2 shows a block diagram of an exemplary embodiment of a system 200 for use with an optical reader 210, such as the reader 110 of FIG. 1. Operation of the system 200 is controlled by a system control unit 202. The control unit 202 is a computer-based device comprising a processor that is programmed to perform one or more of the method acts disclosed in this application. The processor can be coupled to a memory that stores corresponding instructions for the processor.

As mentioned above, the reader 210 can read an image from a display of a portable electronic device 220, or from a non-electronic surface, such as a piece of paper. The portable electronic device 220 is a device with a display for showing images, for example, a mobile telephone, a smart phone, a tablet computer, a computerized wristwatch (e.g., "smartwatch"), a portable computer, or another device. Information read from the portable electronic device 220 by the reader 210 can be sent to one or more other components. For example, the information can be sent to an access control system 230, to an elevator control system 240, or to a database 250. Information read by the reader 210 can also be sent to other components, which can perform specific actions based on the information. Generally, the reader 210 can be configured to send information to any component that is known for processing information obtained by reading optical codes. The components of the system 200 can be connected by any type of network 260.

In some embodiments, a wireless communication network 270 allows the system 200 to transmit information to the portable electronic device 220. For example, the system 200 can send optical code information to the portable electronic device 220. The system 200 can receive instructions to send the optical code information from a computer-based host device 280.

Optical codes used by the embodiments described in this application are one- or two-dimensional images. At least some of the example optical codes depicted in the application are generally square in shape, but other optical codes can have other shapes (e.g., rectangular, round, oval, triangular, or another shape). Information encoded in an optical code can include, for example, a number, a letter, a combination of letters and numbers, or any other type of information.

Information encoded in the optical codes described in this application can be extracted from the code even if a portion of the code is not visible to the optical reader. This is possible because the encoded information is represented in multiple regions of the code. Specifically, particular features that represent the encoded information are repeated in multiple areas of the code. (Examples of such features are described elsewhere in the application.)

Figure 3:
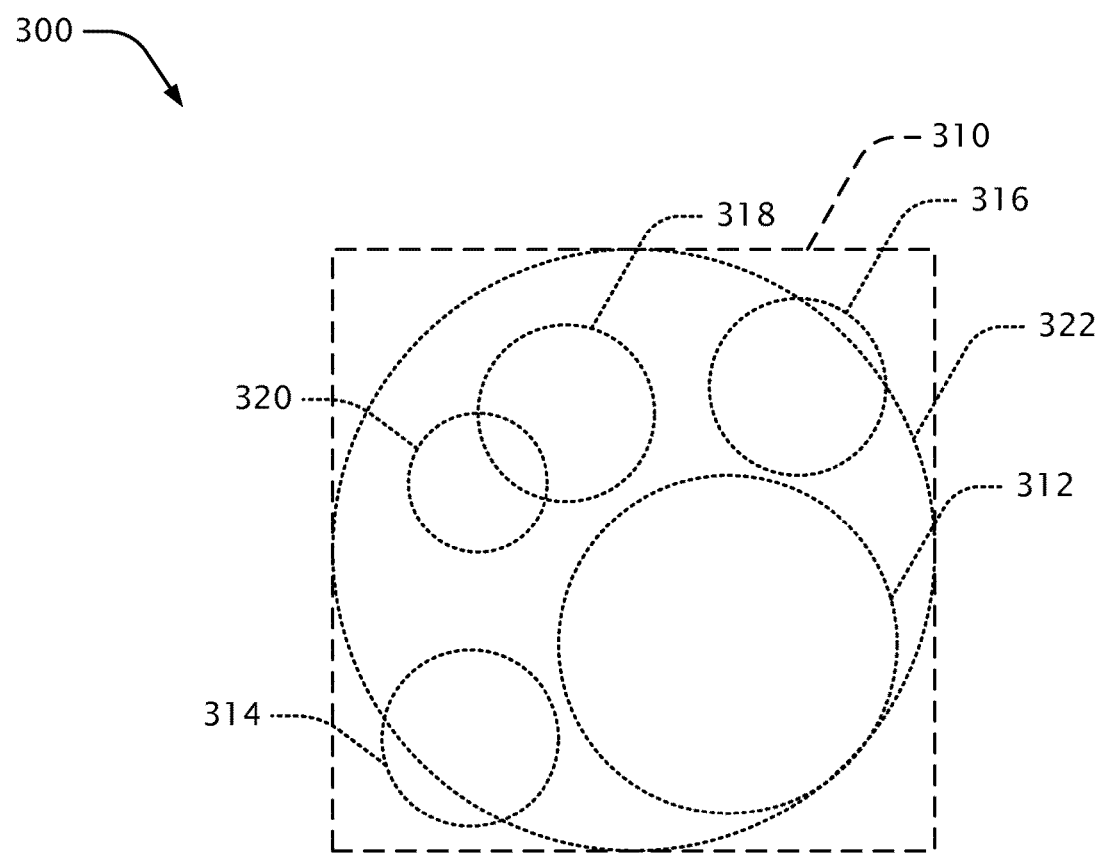
FIG. 3 shows an optical code.

FIG. 3 shows an optical code 300 having an area 310. (For clarity, detailed features of the code 300 are not shown in FIG. 3.) In this example, a so-called encoding region 312 contains sufficient features to represent the encoded information. The encoding regions 314, 316, 318, and 320 also each contain sufficient features to represent the encoded information. As seen in this example, encoding regions can have various sizes and positions. Two encoding regions can also partially overlap, such as the regions 318, 320. The region 322 is an example of an encoding region that contains one or more other encoding regions. The information contained in any one of the regions 312, 314, 316, 318, 320, 322 is sufficient to allow the optical reader to decode the information encoded in the optical code 300, even if one or more other portions of the code are not visible to the reader. A portion of the code may not be visible because, for example: the code is partially obscured by an object (e.g., a user's finger is on part of the display that is showing the code); the optical code is so close to the image sensor of the optical reader that some of the code is outside of the sensor's field of view; the image sensor is dirty or damaged; the display on which the code appears is dirty or damaged; or for another reason. Generally, the larger the number of encoding regions in a code, the more likely that the code will be read successfully. Although the encoding regions shown in FIG. 3 are all circular, encoding regions can also have other shapes (e.g., rectangular, round, oval, triangular, or another shape). Although the regions shown in FIG. 3 are each single, adjacent areas, in further embodiments an encoding region can comprise two or more non-adjacent areas. Each of the non-adjacent areas may or may not by itself contain sufficient features to represent the encoded information, but together they do contain sufficient features.

In at least some embodiments, the number and arrangement of the encoding regions of an optical code are selected according to a known or expected sensing area of an optical reader. The term "sensing area" refers to the area of the optical code that is captured by the optical reader. In different embodiments, the sensing area can have various shapes (e.g., rectangular, round, oval, triangular, or another shape). The "minimal sensing area" is the smallest area of the optical code that an optical reader can capture and still have enough sufficient features to decode the encoded information. In other words, the minimal sensing area needs to contain an encoding region of the optical code. Thus, the encoding regions of an optical code can be arranged such that, regardless of which portion of the optical code is read by the optical reader, as long as the portion is at least as large as the minimal sensing area, the reader can decode the encoded information from the optical code at any position within the code. Of course, in many cases an optical reader might capture as large of a portion of the code as possible, and so the actual sensing area can be larger than the minimal sensing area. A sensing area or a minimal sensing area can comprise a single, adjacent area, or it can comprise two or more non-adjacent areas.

When generating an optical code, it can be assumed that the minimal sensing area may not allow for a desired ease of decoding. For example, a minimal sensing area may provide enough information for decoding a code, but at a slower-than-desired rate, or at a higher-than-desired computational cost. For these reasons, a sensing area somewhat larger than the minimal sensing area can be used (e.g., an area that is larger by 1%, 5%, 10%, 15%, 20%, or by another amount). Using this larger sensing area can make decoding the code easier.

An optical code can be generated using one or more images. In some embodiments, the optical code is based on a single image. In further embodiments, the optical code is based on a combination of two or more images.

Figure 4A:
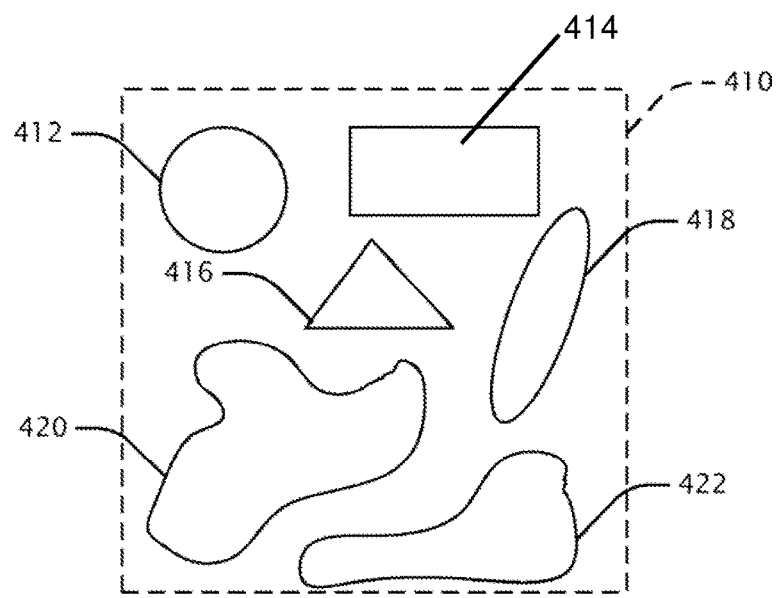
FIGS. 4A-4C show exemplary images.
Figures 4B, 4C:
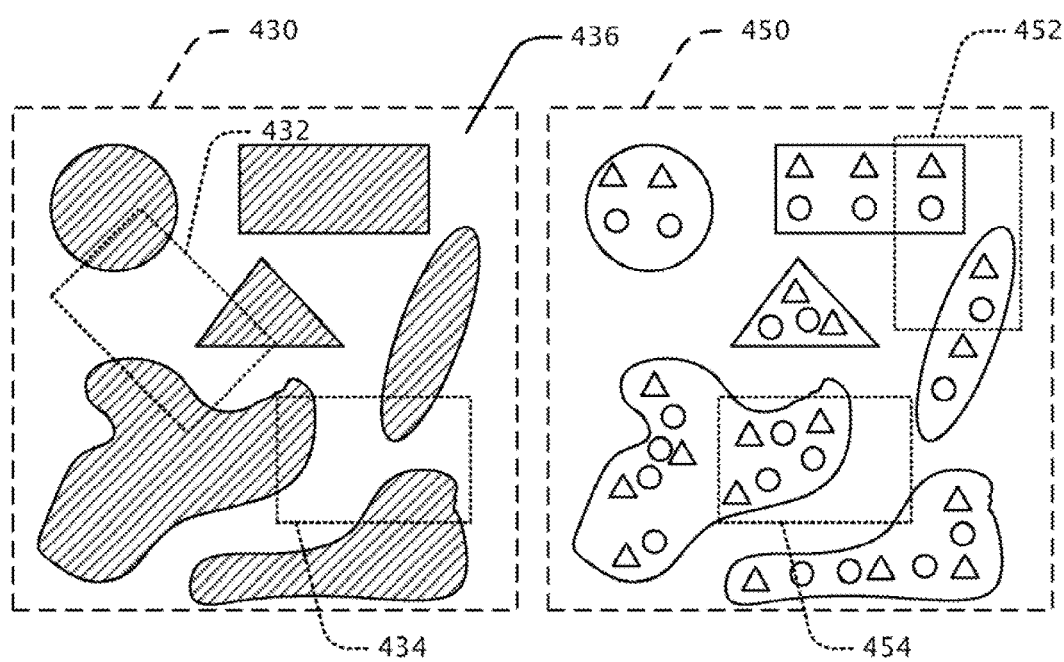

FIG. 4A shows an exemplary image 410, which consists of multiple shapes 412, 414, 416, 418, 420, 422. Although it is not apparent from the line drawing, these shapes are each filled with the same solid color. FIG. 4B shows another exemplary image 430, which consists of multiple shapes like those in the image 410. However, in this case, the surfaces are filled with a pattern, instead of with a solid color. FIG. 4C shows another exemplary image 450, which consists of multiple shapes like those in the image 410. However, in this case, the surfaces are filled with additional shapes, namely small triangles and small circles. In further embodiments, gradients can be used in an image, including shapes that are formed from gradients and thus appear to lack clearly defined borders.

The rectangle 432 in FIG. 4B represents a minimal sensing area for an optical reader that is reading the image 430. In this case, the portion of the image 430 within the rectangle 432 is filled by both patterned shapes of the image 430 and by a background 436. The presence of the shapes and of the background indicates the particular data that is encoded in the image. The rectangle 434 represents another minimal sensing area for the image 430. Also in this case, the portion of the image 430 within the rectangle 434 is filled by both patterned shapes and by the background 436. A sensing area larger than the minimal sensing areas 432, 434 would likewise cover portions of both the background and the patterned shapes. In the case of FIG. 4B, the background 436 can be, for example, a solid color or another pattern.

In various embodiments, the background of an image is not used to encode data, but to help calibrate the image sensor of the optical reader. The background can also serve as a decoration.

Turning to FIG. 4C, the rectangles 452, 454 each represent minimal sensing areas for an optical reader that is reading the image 450. In this particular image, the relevant feature is the ratio of the number of small triangles to the number of small circles within a predefined area. In each of the areas 452, 454, the ratio of small circles to small triangles is 1:1. The optical reader can recognize this ratio and use it to identify the image 450 (i.e., to distinguish the image 450 from at least one other image). A sensing area larger than the minimal sensing areas 452, 454 would likewise cover a portion of the image 450 in which the ratio of small circles to small triangles is 1:1, since this feature is generally consistent over the whole of the image 450.

Figure 5:
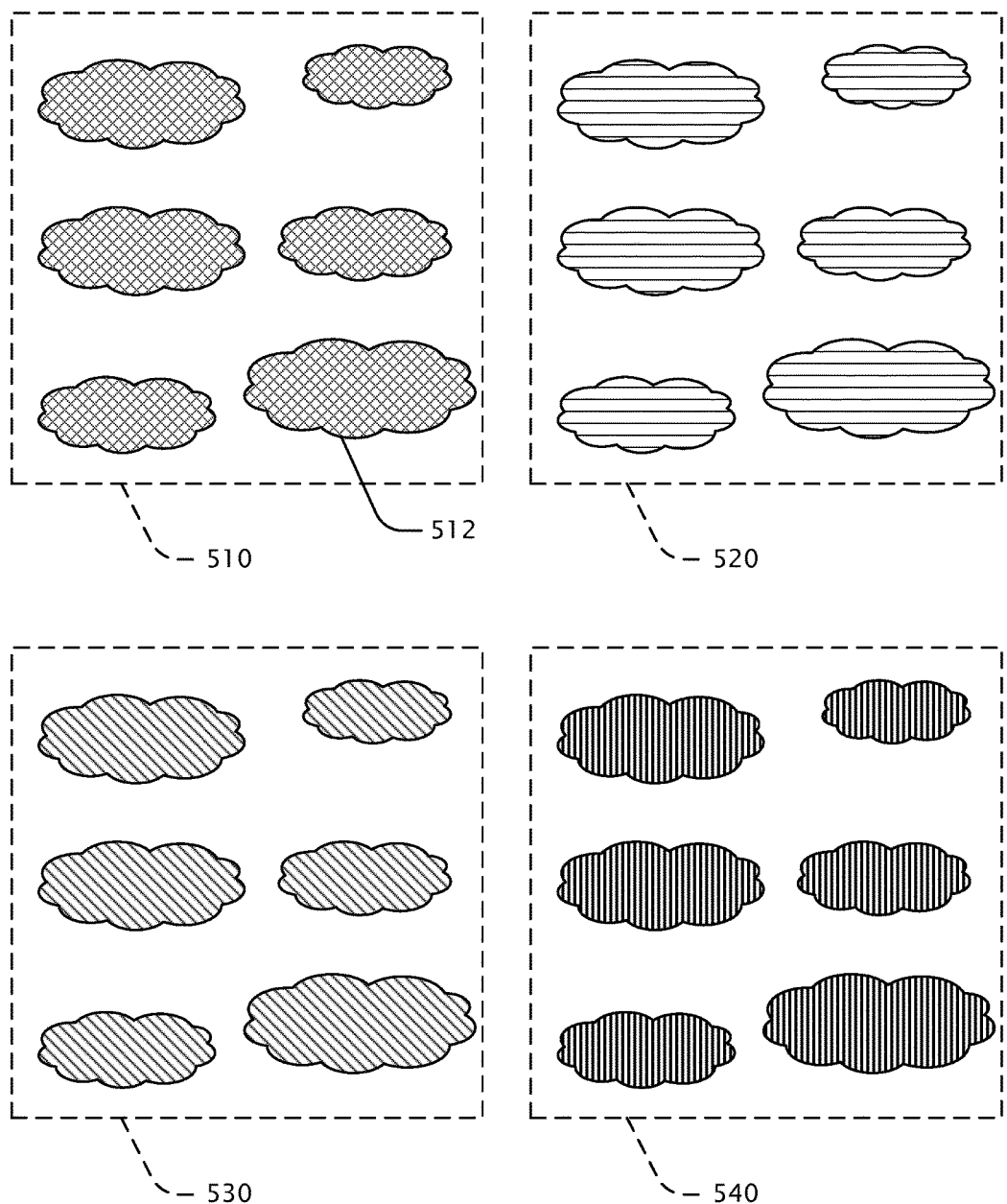
FIG. 5 shows exemplary images.
Figure 6:
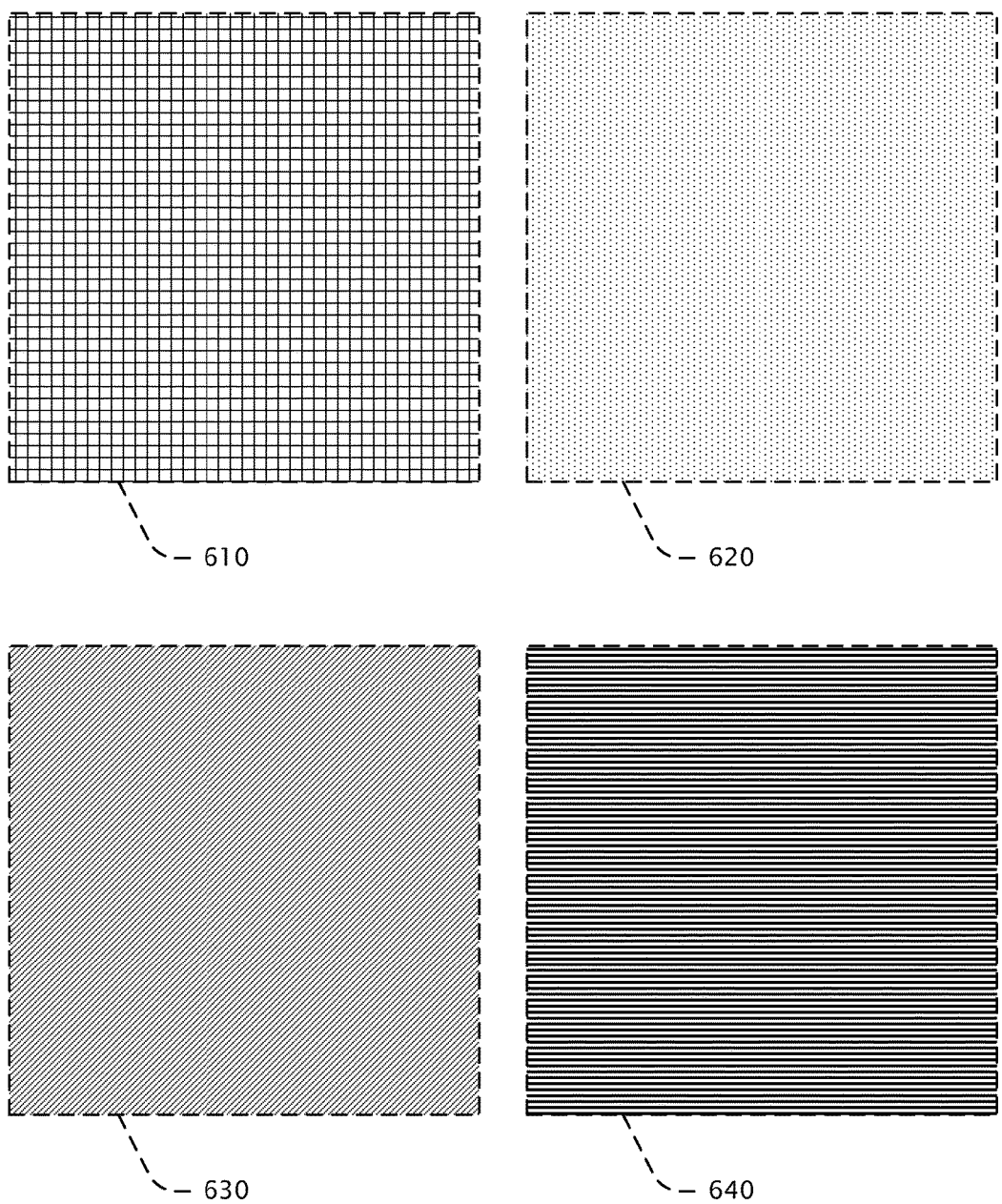
FIG. 6 shows exemplary images with respective patterns.
Figure 7:
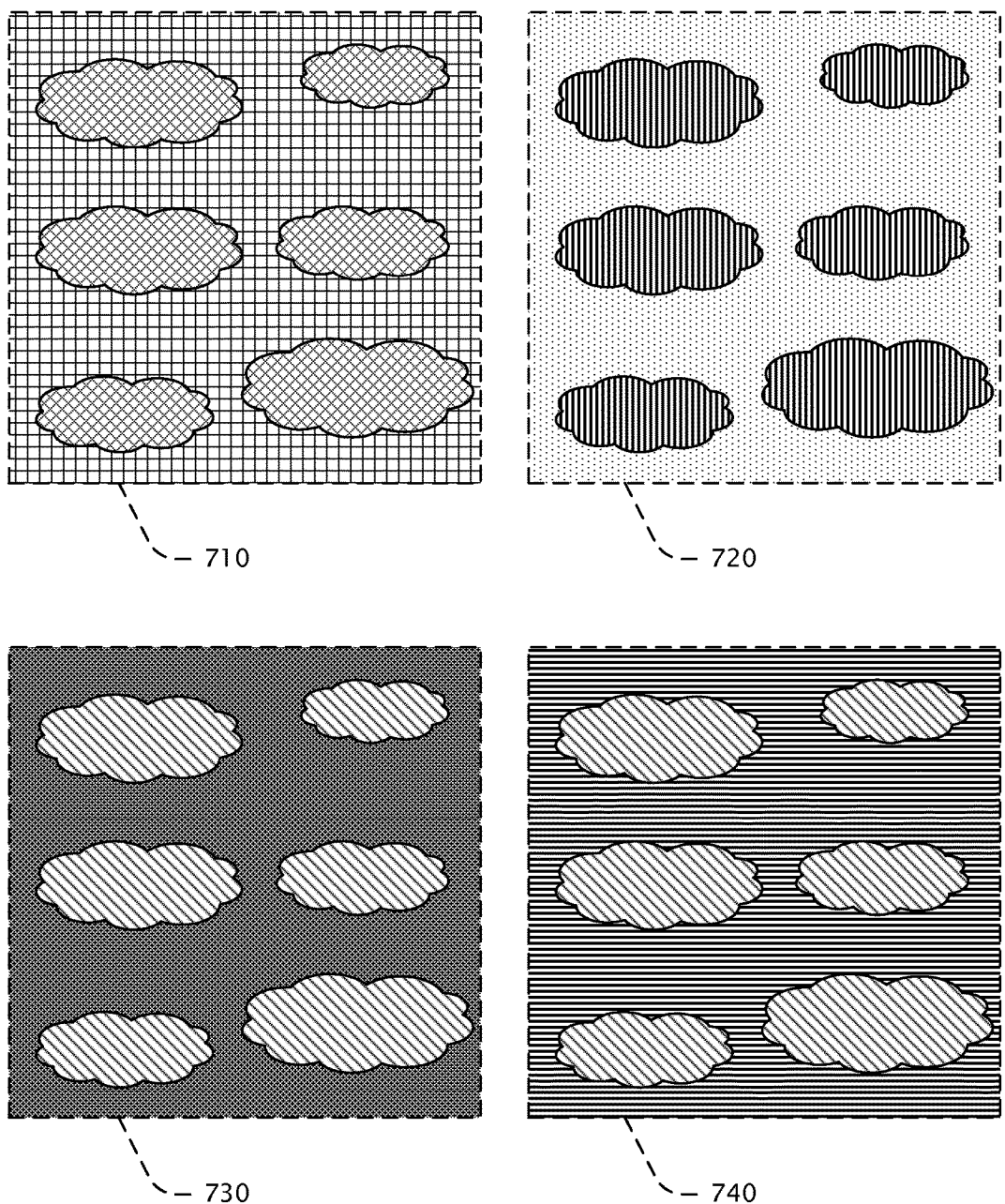
FIG. 7 shows exemplary combined images.

In some embodiments, an optical code is formed by combining one or more images. FIG. 5 shows exemplary images 510, 520, 530, 540, each of which comprises a group of shapes, such as the shape 512 in image 510. The images 510, 520, 530, 540 differ from each other in that their shapes are filled with different patterns. FIG. 6 shows exemplary images 610, 620, 630, 640, each of which is filled with a respective pattern. FIG. 7 shows how selected images of FIGS. 5 and 6 could be combined with each other to create optical codes. For example, the image 710 is a combination of the images 510 and 610; the image 720 is a combination of the images 540 and 620; the image 730 is a combination of the images 530 and 630; and the image 740 is a combination of the images 530 and 640. Each of the images in FIG. 7 can be used to represent a particular value. For example, the image 710 can indicate a "0", the image 720 can indicate a "1", the image 730 can indicate a "3", and the image 740 can indicate a "4". Additional combinations based on the images of FIGS. 5 and 6 can also be used and assigned respective values.

In some embodiments, the images of FIG. 5 could be combined with a solid-colored background instead of with patterned backgrounds, like those of FIG. 6.

In further embodiments, elements of an optical code are arranged in a grid of spaces. The spaces in the grid can be square in shape, or they can have another shape. The spaces can have a border around the contents of the space (e.g., a black line, or a line of another color), or the spaces may have no border around their contents. Each element that is arranged in a space of the grid has a visible feature that allows the optical reader to distinguish it from another possible element (which may or may not actually be present in the grid). Possible features can include, for example: colors, patterns, shapes, gradients, letters, numbers, or other properties.

Figure 8A:
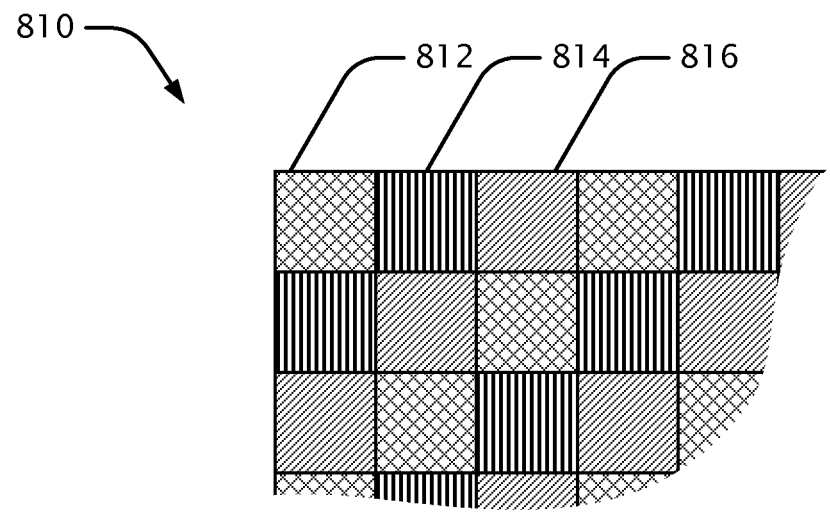
FIGS. 8A and 8B show portions of optical codes.

FIG. 8A shows an upper left-hand portion of an exemplary optical code 810. The code 810 comprises elements arranged in a grid, such as elements 812, 814, 816. The elements 812, 814, 816 are squares, each having a different fill pattern. The remaining square elements of the grid each have one of these fill patterns, such that the elements 812, 814, 816 are repeated in sequence over the optical code 810. The particular patterns used, the relative proportions in which elements with those patterns appear in the code 810, or both, indicate the particular information encoded in the code 810.

Figure 8B:
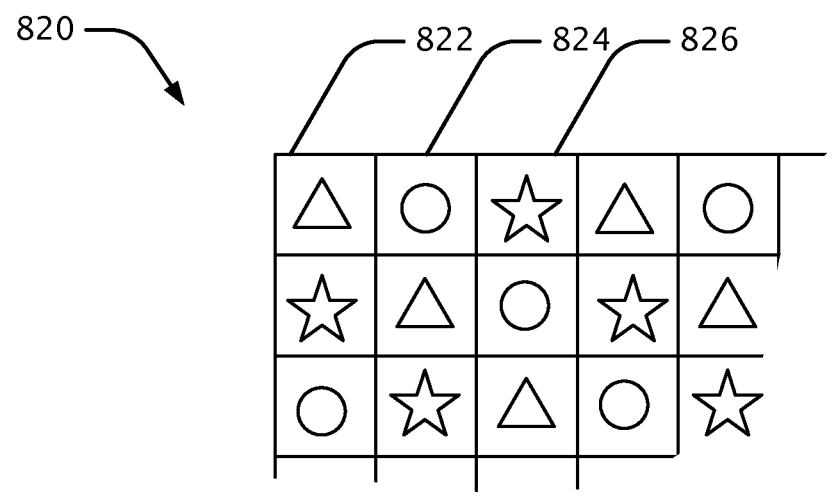

FIG. 8B shows an upper left-hand portion of an exemplary optical code 820. The code 820 also comprises elements arranged in a grid, such as elements 822, 824, 826. These elements are squares, but they are filled with various shapes: the element 822 contains a triangle, the element 824 contains a circle, and the element 826 contains a star. The remaining square elements of the grid each contain one of these shapes, such that the elements 822, 824, 826 are repeated in sequence over the surface of the optical code 820. The particular shapes used, the relative proportions in which elements with those shapes appear in the code 820, or both, indicate the particular information encoded in the code 820.

Figure 9:
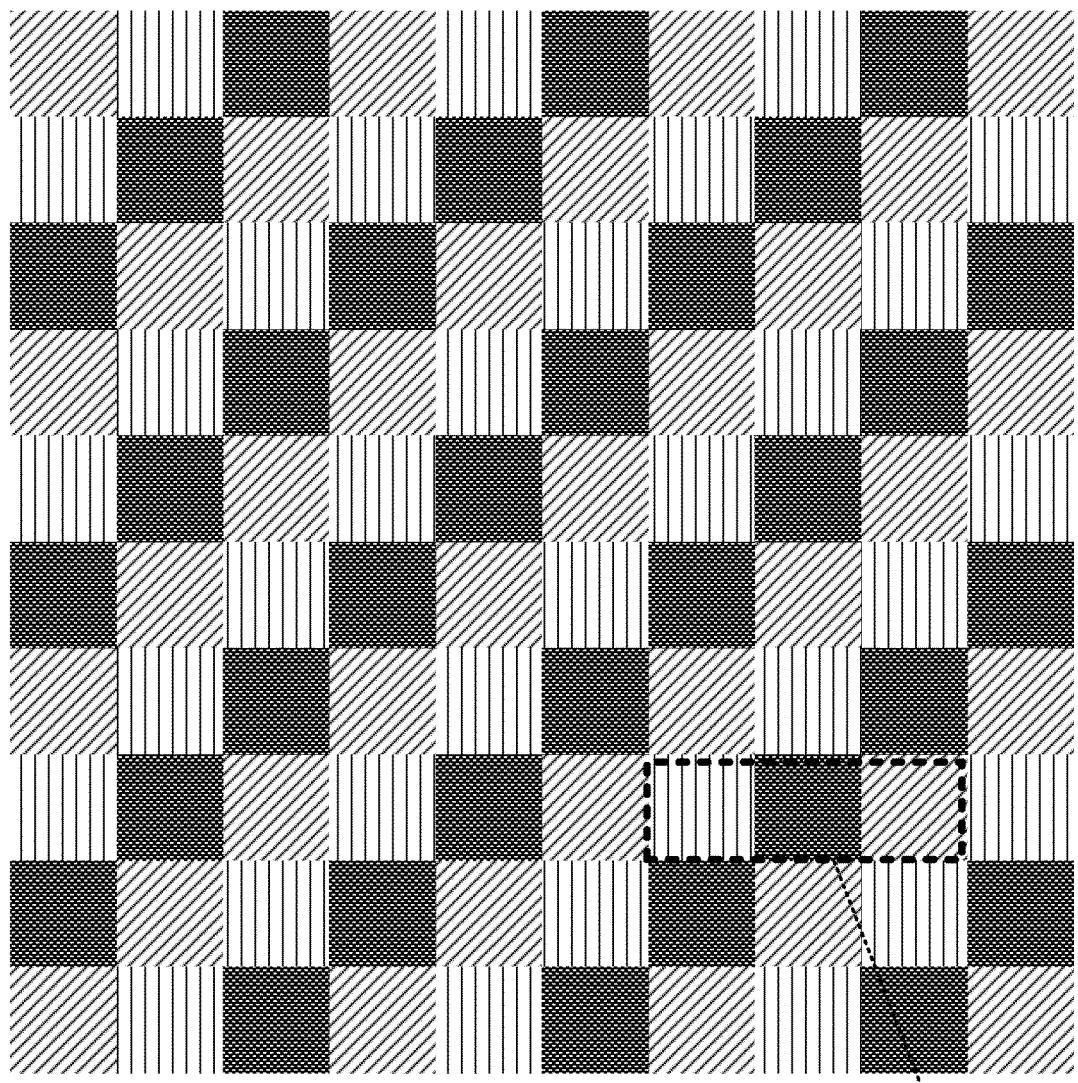
FIG. 9 shows an exemplary optical code in which the elements are arranged in a grid.
Figure 9:
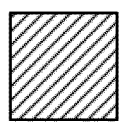
Figure 9:
Figure 9:
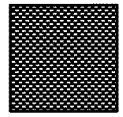

FIG. 9 shows an exemplary optical code 900 in which the elements (color-filled squares) are arranged in a grid. Each of the elements in the grid is a red, green, or blue square. (In the line drawing of FIG. 9, each of the colors is represented by a different pattern, as indicated in the figure.) In one embodiment, the elements are approximately 0.2-0.3 cm square; other element sizes can also be used. Although the example of FIG. 9 uses three different colors of squares, additional embodiments can use any number of colors (e.g., two colors, four colors, five colors, six colors, or another number of colors), any number of fill patterns, or both. Generally, using a smaller number of colors or patterns means that the colors or patterns can be more distinct from each other, and thus more easily distinguished by the optical reader. However, using a larger number of colors or patterns increases the amount of information that can be encoded in an optical code.

The rectangle 910 represents a minimal sensing area for the code 900. In this case, the rectangle 910 has a size of approximately one element by three elements. This area is large enough to determine the ratio of the red, green, and blue squares in the code 900. Of course, larger sensing areas could also be used. For example, a sensing area that is three elements by three elements could be used. Depending on the embodiment, the ratio can be determined based on the number of squares, or based on the surface area occupied by the squares.

In some cases, the size of a minimum sensing area is at least partly a function of how many different types of elements are available (e.g., in this example, how many different colors of squares). For example, if the code 900 could be constructed of squares of five different colors or ten different colors, then the rectangle 910 would be too small to determine the ratio of all five colors or all ten colors. Generally, while the concept of minimal sensing area can be useful in understanding the disclosed technologies, the optical reader does not need to know or use a minimal sensing area of a particular optical code when decoding the code. In particular embodiments, the optical reader is programmed to recognize one or more features of an optical code and, based on the recognized features and their sizes, determine the size of the image. The reader can then scale the image, if needed. Based on size of the image, the reader can also determine the minimal sensing area for the optical code.

The code 900 can be used with an embodiment in which the ratio of a set of colors determines the value encoded in the code. Table 1 below gives an example encoding scheme. In the table, "R" stands for red, "G" stands for green, and "B" stands for blue.

TABLE 1

| Encoded Value | Ratio (R:G:B) |
| --- | --- |
| 0 | 1:1:1 |
| 1 | 2:1:0 |
| 2 | 3:0:0 |
| 3 | 1:0:2 |
| 4 | 0:0:3 |
| 5 | 1:2:0 |

Applying the encoding scheme of Table 1 to the example of code 900, we see that the code 900 contains an R:G:B ratio of 1:1:1. Thus, the code 900 is interpreted as encoding a value of 0.

In particular embodiments, depending on factors such as the size of the grid, the number of colors used for the grid elements, and the pattern used in arranging the elements in the grid, the optical code could appear to be composed of vertical or horizontal colored bars instead of individual square elements.

In further variations of the embodiment of FIG. 9, the grid spaces are occupied by colored shapes other than colored squares. For example, rectangles, circles, ovals, triangles, crosses, rhombuses, trigrams, or other shapes can be used.

The examples of FIGS. 8A, 8B, and 9 describe embodiments in which elements (e.g., shapes, pattern-filled squares, color-filled squares) are repeated in a given order with a grid. In further embodiments, the elements in the grid are not repeated in any particular order. For example, the elements can be arranged in the grid in a random order, or in a pseudo-random order. However, in at least some cases, the minimal sensing area for an image can be smaller if the elements are repeated in a given order, since this can help ensure that the elements are distributed more evenly throughout the optical code.

The examples of FIGS. 8A, 8B, and 9 also describe embodiments in which a given set of elements is repeated along rows or along columns within the grid. For example, FIG. 9 shows a pattern of "red square, green square, blue square" repeated along each row of the grid. In further embodiments two or more sets of elements are repeated orthogonally to each other in a grid. In one example, a grid of colored squares contains a first set of elements, "red square, green square, blue square", and a second set of elements, "black circle, yellow star, green square gradient". The first and second sets are repeated over the grid, the first and second sets being arranged orthogonally to each other.

Figure 10:
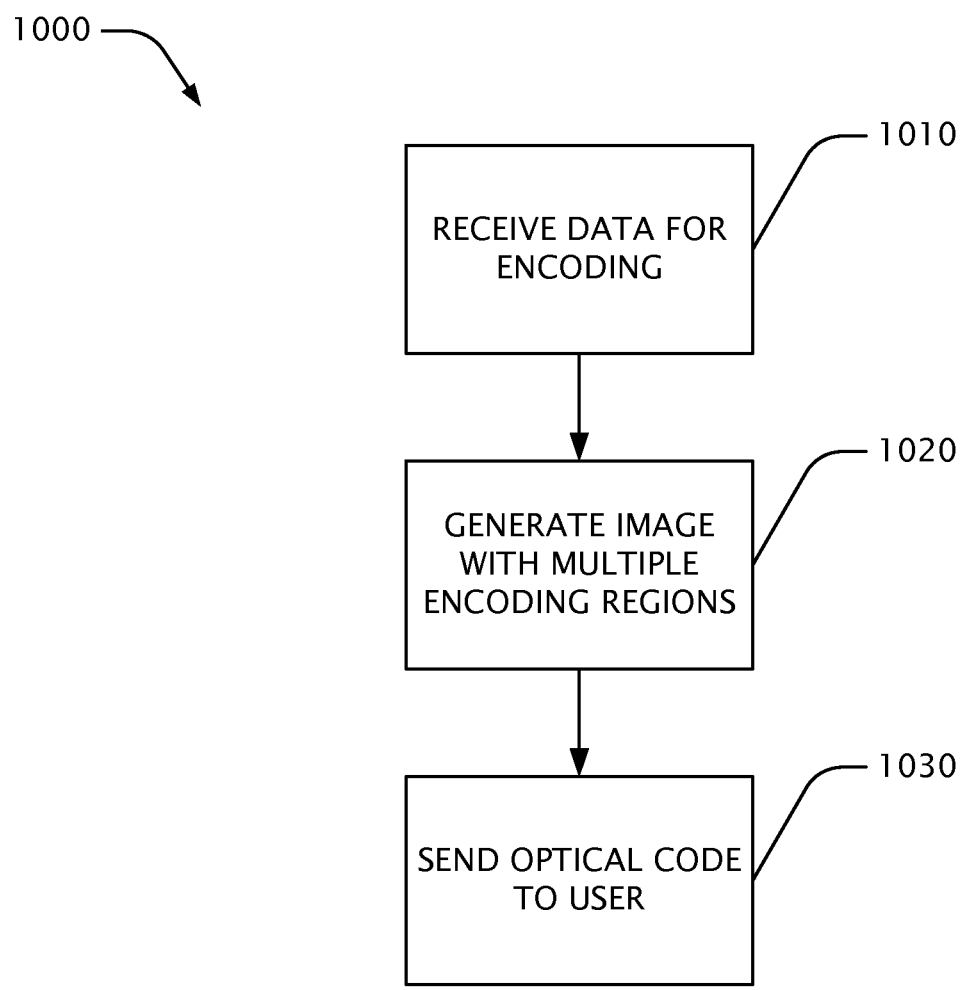
FIG. 10 shows an exemplary embodiment of a method for generating an optical code.

FIG. 10 shows an exemplary embodiment of a method 1000 for generating an optical code. The method 1000 is performed by a computer and can be used generally to generate any of the optical code embodiments discussed herein. In a method act 1010, the computer receives data for encoding in an optical code. The data comprises, for example, a number, a letter, a word, or another piece of information. In a method act 1020, the computer generates an image with multiple encoding regions, each of the regions containing a respective representation of the data. In other words, the data is encoded in each of the encoding regions so that, as discussed above, the data can be decoded using any one of the regions. In some cases, the optical code is sent to a user in a method act 1030. The user can then present the code to a code reader.

Figure 11:
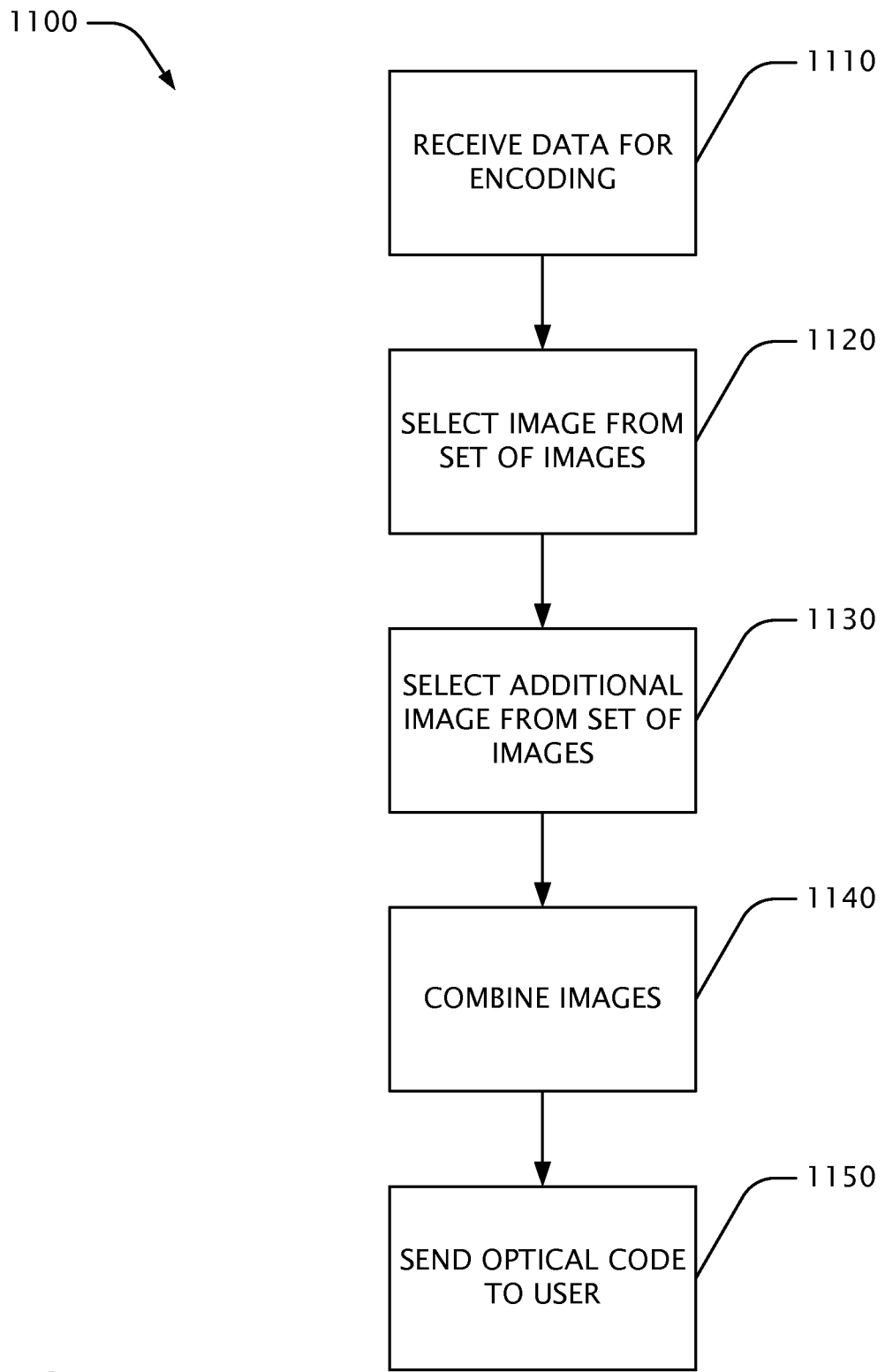
FIG. 11 shows an exemplary embodiment of another method for generating an optical code.

FIG. 11 shows an exemplary embodiment of another method 1100 for generating an optical code. Like the method 1000, the method 1100 is performed by a computer and can be used to generate any of the optical code embodiments discussed herein. In a method act 1110, the computer receives data for encoding in an optical code. The data comprises, for example, a number, a letter, a word, or another piece of information.

In a method act 1120, the computer selects an image from a set of encoding images. The encoding images are images that can be used to represent the data. For example, the image of FIG. 9, and the other images that are described in connection with the example of FIG. 9, can form a set of encoding images from which an image can be selected. The images from FIGS. 4A-4C can also form such a set. In some cases, the selected image contains at least two elements that represent a ratio indicating the encoded data. For example, the optical code 450 of FIG. 4C contains small triangles and small circles, which represent a ratio. As another example, in FIG. 9, the red, green, and blue squares represent a ratio. In other cases, the presence of particular elements (e.g., elements of a certain color or pattern) indicates the encoded data.

In some embodiments, the image selected in the method act 1120 forms the optical code.

In some embodiments, after an image is selected, an additional image is selected from a set of encoding images in a method act 1130. The selected images are combined in a method act 1140 to form the optical code. The images of FIGS. 5 and 6 are examples of sets of images from which the two images could be selected. FIG. 7 shows examples of combined images created from the images of FIGS. 5 and 6.

Whether an optical code is generated based on combined images or on a single image depends on the particular embodiment. In many cases, similar or identical optical codes can be generated using single or combined images.

For example, the image of FIG. 9 could be generated by combining three images, each comprising sets of squares for a respective color. As another example, the images of FIG. 7 could also each be stored as single images, so that they need not be generated from two separate images when used.

Returning to FIG. 11, in some cases, the optical code is sent to a user in a method act 1150. The user can then present the code to a code reader.

Figure 12:
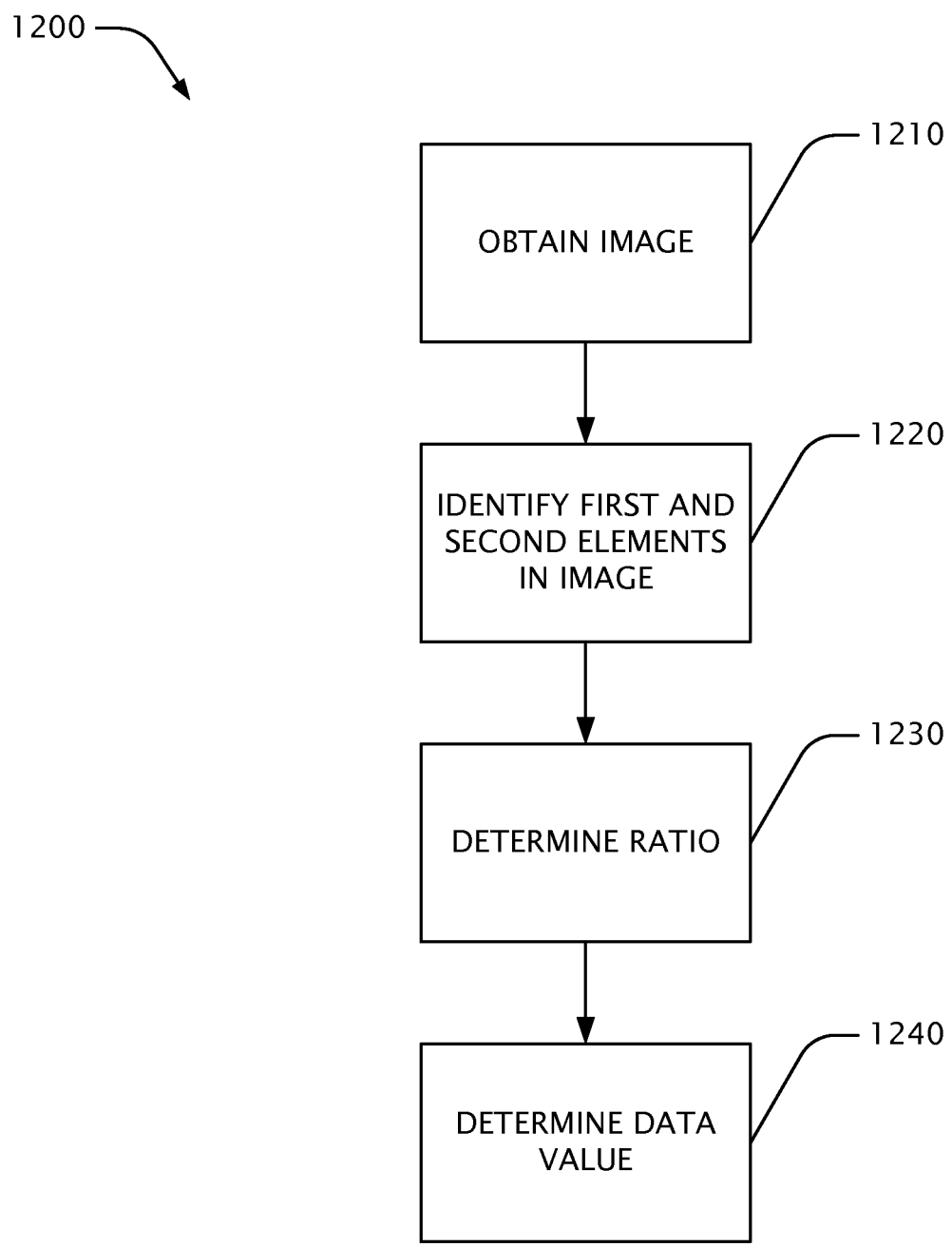
FIG. 12 shows an exemplary embodiment of a method for decoding an optical code.

FIG. 12 shows an exemplary embodiment of a method 1200 for decoding an optical code. In a method act 1210, an optical reader obtains an image using an image sensor. Usually, the image is at least a portion of a picture shown on the display of a portable electronic device. However, in some embodiments, the picture is on a piece of paper or other non-electronic surface. The picture comprises an embodiment of any of the optical codes disclosed herein. As such, the resulting image contains at least one encoding region, and possibly multiple encoding regions. A given encoding region can be comprised of multiple, non-adjacent, smaller areas. In some embodiments, each of the encoding regions contains at least first and second elements, the ratio between the elements representing a common, encoded data value. In other cases, the presence of particular elements (e.g., elements of a certain color or pattern) indicates the encoded data.

In a method act 1220, the optical reader identifies the first and second elements in the image. This can be done using any computer-vision algorithm, for example, algorithms from a computer-vision library such as OpenCV.

In some embodiments, the reader identifies the largest area or areas of each color in the image, possibly using a function from a computer-vision library. This technique can be used with, for example, the multi-colored grid of FIG. 9. Once the area of each color is determined, then a ratio of the areas of each color is determined. Based on the ratio, an encoded value is determined (e.g., using a lookup table). An example of pseudocode for such an embodiment (using colors) appears below:

a=find_area (color=red)
b=find_area (color=green)
c=find_area (color=blue)
r=evaluate_ratio (a, b, c)
encoded_value=decode (r)

Another example of pseudocode for such an embodiment (using shapes) appears below:

Num_shape_1=count (findshape (cross))
Num_shape_2=count (findshape (square))
r=evaluate_ratio (Num_shape_1, Num_shape_2)
encoded_value=decode (r)

In further embodiments, the reader identifies particular patterns or shapes in the optical code. Based on which patterns or shapes are present in the code, the reader determines an encoded value. An example of pseudocode for such an embodiment (using patterns) appears below:

a=find_pattern (dots)
b=find_pattern (lines)
c=find_pattern (crosshatch)
encoded_value=decode (istrue (a), istrue (b), istrue (c))

In embodiments that use a ratio between image elements, in a method act 1230 the ratio of the first and second elements of the image is determined. The ratio can be based on (1) the respective numbers of the first and second elements, or it can be based on (2) the sizes of the respective surface areas occupied by those elements in the image, or it can be based on a mixture of (1) and (2). In embodiments that do not use a ratio, this method act is omitted.

In a method act 1240, the optical reader determines the encoded data value based on the determined ratio or the determined elements. This can be done using, for example, a data structure that indicates which data values correspond to which ratios or to which pairs of elements. An example of this is Table 1, above. In some embodiments, the determined data value is passed on to another component or system, such as an access control system.

Although the method acts of the method 1200 are described as being performed by the optical reader, at least some of the method acts can be performed by a computer-based control unit, instead.

Figure 13:
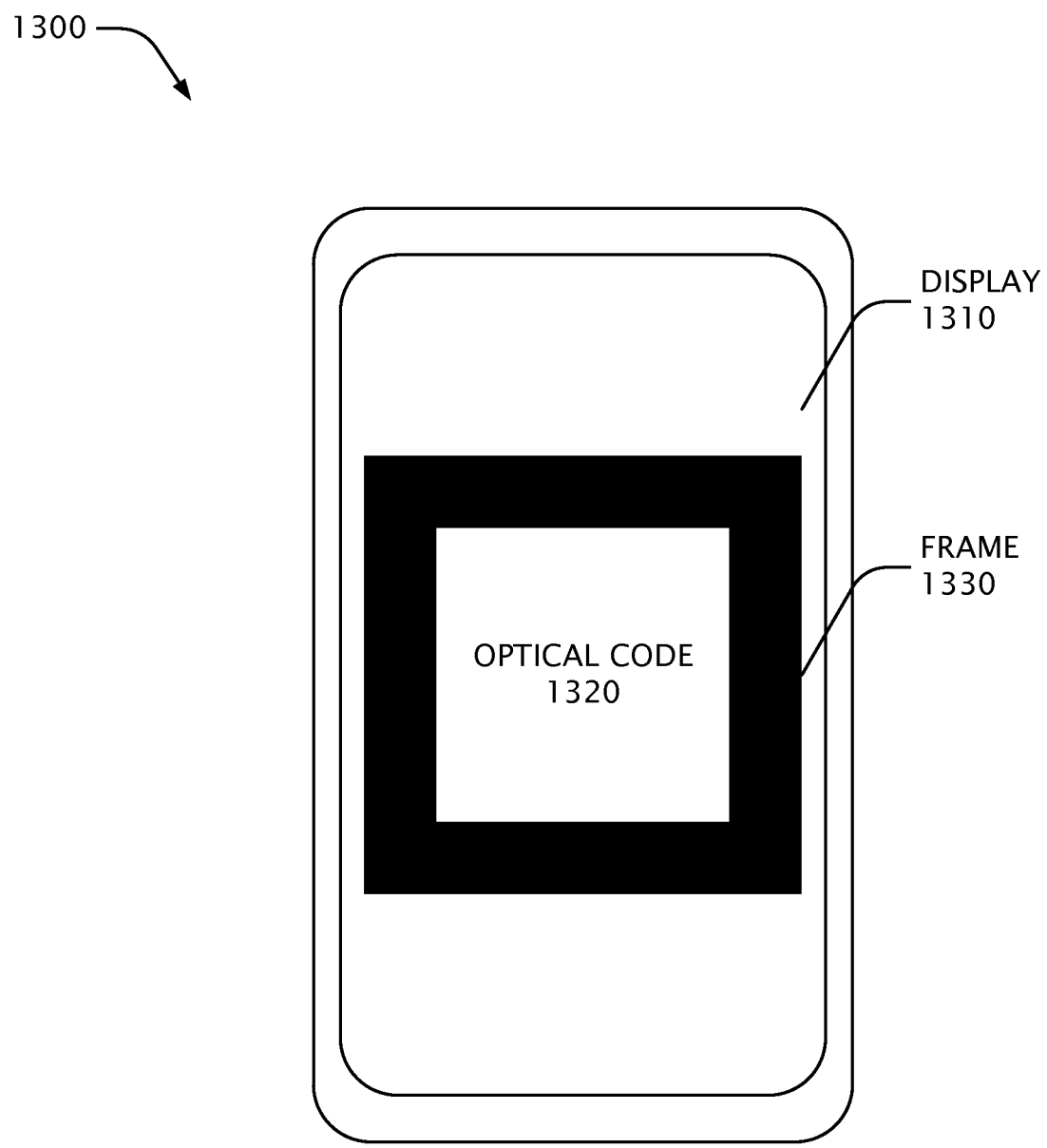
FIG. 13 shows an exemplary embodiment of a portable electronic device.

FIG. 13 shows an exemplary embodiment of a portable electronic device 1300, which comprises a display 1310. In this embodiment, the optical code 1320 is shown on the display 1310 surrounded by a frame 1330. The frame 1330 helps show the boundaries of the code 1320 so that the optical reader is less likely to interpret objects outside of the code 1320 as being part of the code. In FIG. 13, the frame 1330 is a thick, black line, but in various embodiments, the frame 1330 can have other forms and colors.

In particular embodiments, the optical reader reads a series of multiple optical codes. The reader can view these codes on the display of, for example, a smartphone or other device, or on a non-electronic surface, such as a piece of paper. The codes are shown one after another, similar to the format of a motion picture or a slide show. The codes can be shown in a loop to allow the reader multiple opportunities to recognize them. Using multiple codes can increase the amount of information that the optical reader reads from the device. In some embodiments, one of the optical codes serves as parity information (e.g., as a parity bit, or as a parity image). In additional embodiments, one of the codes indicates the start of the series of codes.

In some cases, when the portable electronic device displays a sequence of optical codes, readability of the individual codes can be improved by displaying a "neutral" frame between each code. The neutral frame is an image that primarily serves to indicate a transition between optical codes. For example, the neutral frame can be a solid-color frame, such as black, gray, white, or another color. Additionally, the codes can be shown at a higher speed than a frame rate of the optical reader. For example, the codes can be shown at about twice the frame rate of the optical reader (e.g., the reader has a frame rate of about 30 fps, and the images are shown at about 60 fps). This can avoid problems that arise when the display of the electronic device and the image sensor of the optical reader are not synchronized.

A portable electronic device can display an optical code using various software programs, for example: a web browser; a media viewer (e.g., for graphics, for films, or both); a dedicated application; or another program.

In at least some of the disclosed embodiments, the features of an optical code are large enough to be discerned by the human eye.

In any of the disclosed embodiments, a fill pattern can include numbers, letters, or other characters. In further embodiments, an image for forming an optical code comprises one or more bars (straight bars, wavy bars, gradient bars) that extend across at least part of the image.

Figure 14:
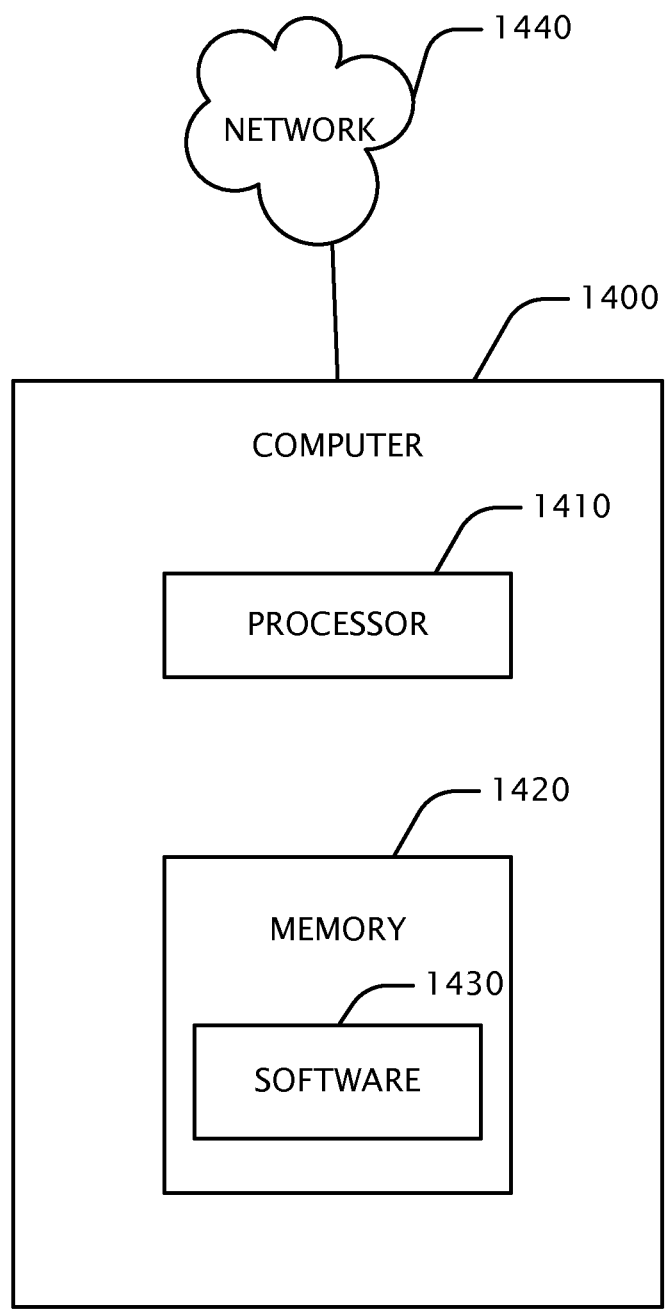
FIG. 14 shows a block diagram of an exemplary embodiment of a computer.

FIG. 14 shows a block diagram of an exemplary embodiment of a computer 1400 (e.g., part of a system control unit, part of an optical reader, part of a database, part of a portable electronic device) that can be used with one or more technologies disclosed herein. The computer 1400 comprises one or more processors 1410. The processor 1410 is coupled to a memory 1420, which comprises one or more computer-readable storage media storing software instructions 1430. When executed by the processor 1410, the software instructions 1430 cause the processor 1410 to perform one or more of the method acts disclosed herein. Further embodiments of the computer 1400 can comprise one or more additional components. The computer 1400 can be connected to one or more other computers or electronic devices through an input/output component (not shown). In at least some embodiments, the computer 1400 can connect to other computers or electronic devices through a network 1440. In particular embodiments, the computer 1400 works with one or more other computers, which are located locally, remotely, or both. One or more of the disclosed methods can thus be performed using a distributed computing system.

Generally, the disclosed embodiments allow an optical reader to read information from an optical code, even if a portion of the code is unreadable or unavailable. Thus, the robustness of the optical reader is improved.

At least some of the disclosed embodiments provide optical codes that can be read more quickly than other optical codes (e.g., QR codes).

Any of the disclosed optical codes can be read when a portion of the code is not visible to the optical reader.

Generally, the disclosed embodiments allow an optical code to be read while the code is moving relative to the optical reader, which makes the code-reading process more robust. For example, the code can be read while it is moving towards or away from the reader. As another example, the code can be read while it is being rotated relative to the reader, or while being held at an angle relative to the reader. These aspects can improve readability in situations where a user does not hold the optical code still during reading (e.g., if the user is physically unable to do so because of age or handicap).

Further embodiments do not require an image sensor to be focused on the surface that is displaying the optical code. Thus, the image sensor does not need to be able to perform focusing. If the sensor can perform focusing, then the sensor will still be able to adequately read the code before focusing occurs. This can allow the code to be read more quickly, especially if the surface that is displaying the code is moving during reading.

The disclosed embodiments can generally be used with any optical code application. One example application is access control. A guest can receive an optical code from a host, the optical code having been sent at the request of the host. In some cases, a fee is charged for the request. The guest's smartphone can receive the optical code, possibly over a wireless network. The optical code can comprise a single image or a time-varying sequence of multiple images (e.g., a film). When the guest approaches the security gate at the host's building, the guest uses the smartphone to display the optical code, and the guest presents the smartphone to an optical reader. The reader reads the code from the phone and transmits the code to an access control system. Upon verifying the code, the access control system allows the guest to enter the building.

Although certain data are described herein as being stored in a table or in another data structure, generally such data can be stored in any suitable type of data structure; a structure storing the data can be generated using an algorithm.

Although some embodiments of the various methods disclosed herein are described as comprising a certain number of method acts, further embodiments of a given method can comprise more or fewer method acts than are explicitly disclosed herein. In additional embodiments, method acts are performed in an order other than as disclosed herein. In some cases, two or more method acts can be combined into one method act. In some cases, one method act can be divided into two or more method acts.

As used herein, a "user" can be a person, a group of persons, a machine, or an animal.

Unless stated otherwise, a phrase referring to "at least one of" a list of items refers to any combination of those items, including single members. As an example, at least one of: a, b, or c" is intended to cover: a; b; c; a and b; a and c; b and c; and a, b and c. As another example, at least one of: a, b, and c" is intended to cover: a; b; c; a and b; a and c; b and c; and a, b and c.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method of data transmission, comprising the steps of:
receiving a data value for encoding in an image; and
generating the image, the image comprising a plurality of encoding regions, each of the encoding regions containing a respective representation of the data value, the data value being discernible based on any one of the encoding regions of the plurality of encoding regions, the encoding regions being arranged with a selected density of at least two of the encoding regions within the image, wherein the representation of the data value is based on a ratio of a first element in one of the encoding regions and a second element in the one of the encoding regions.

2. The method according to claim 1 wherein the generating the image comprises selecting, based on the data value, an encoding image out of a set of encoding images.

3. The method according to claim 2 wherein the selected encoding image comprises a plurality of elements arranged in a grid, the elements being identical elements or being different elements.

4. The method according to claim 3 wherein the plurality of elements comprises colored shapes.

5. The method according to claim 4 wherein the colored shapes comprise at least one of squares, rectangles, circles, crosses, triangles, ovals, rhombuses, stars, and trigrams.

6. The method according to claim 4 wherein the colored shapes are at least one of red, blue, and green.

7. The method according to claim 3 wherein the plurality of elements is arranged in a repeating pattern in the grid.

8. The method according to claim 2 wherein the selected encoding image comprises a first element in the representation of the data value, the generating the image further comprising:
selecting, based on the data value, an additional encoding image out of the set of encoding images, the selected additional encoding image comprising a second element in the representation of the data value; and
combining the selected encoding image and the selected additional encoding image.

9. The method according to claim 1 wherein the ratio is a ratio of a number of the first element to a number of the second element.

10. The method according to Claim 1 wherein the ratio is a ratio of a surface area occupied by the first element to a surface area occupied by the second element.

11. The method according to claim 1 wherein the image is one in a sequence of images for decoding, each of the images in the sequence of images encoding a portion of a piece of information.

12. The method according to claim 11 wherein the sequence of images is a time-varying sequence displayed on an electronic display.

13. A method of data transmission, comprising the steps of:
using an image sensor, obtaining an image of at least a portion of a picture shown on a surface, the picture comprising a plurality of encoding regions, each of the encoding regions containing a respective representation of a data value, the data value being common for each of the encoding regions and the encoding regions being arranged with a selected density within the image of at least two of the encoding regions, wherein the representation of the data value is based on a ratio of a first element in one of the encoding regions and a second element in the one of the encoding regions;
identifying first and second elements in at least one of the encoding regions; and
based on the identified first and second elements, determining the data value.

14. The method according to claim 13 wherein each of the respective representations of the common data value is based on a ratio between the first element in the representation and the second element in the representation, the determining the common data value comprising determining the ratio and determining an associated value for the ratio.

15. A system for data transmission, comprising:
an image sensor; and
a computer-based control unit coupled to the image sensor, the control unit being configured to,
obtain, using the image sensor, an image of at least a portion of a picture shown on a surface, the picture comprising a plurality of encoding regions, each of the encoding regions containing a respective representation of a common data value, the encoding regions being arranged within the image with a selected density of at least two of the encoding regions, wherein the representation of the common data value is based on a ratio of a first element in one of the encoding regions and a second element in the one of the encoding regions,
identify first and second elements in at least one of the encoding regions, and
based on the identified first and second elements, determine the common data value.

16. The system according to claim 15 wherein the image sensor is configured to read the image without focusing on the surface.

17. A computer-readable storage medium having encoded thereon instructions that, when executed by a computer, cause the computer to perform a method, the method comprising the steps of:
receiving a data value for encoding in an image; and
generating the image, the image comprising a plurality of encoding regions, each of the encoding regions containing a respective representation of the data value, the data value being discernible based on any one of the encoding regions, the encoding regions being arranged with a selected density within the image of at least two of the encoding regions, wherein the representation of the data value is based on a ratio of a first element in one of the encoding regions and a second element in the one of the encoding regions.

* * * * *